United States Patent
Onishi et al.

(10) Patent No.: US 8,543,744 B2
(45) Date of Patent: Sep. 24, 2013

(54) A/D CONVERTER AND PROGRAMMABLE CONTROLLER SYSTEM

(75) Inventors: Atsuko Onishi, Chiyoda-ku (JP);
Yoshiyuki Kubota, Chiyoda-ku (JP);
Satoru Ukena, Chiyoda-ku (JP);
Shigeaki Takase, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 216 days.

(21) Appl. No.: 13/202,507

(22) PCT Filed: Mar. 23, 2009

(86) PCT No.: PCT/JP2009/055692
§ 371 (c)(1),
(2), (4) Date: Aug. 19, 2011

(87) PCT Pub. No.: WO2010/109584
PCT Pub. Date: Sep. 30, 2010

(65) Prior Publication Data
US 2011/0307635 A1    Dec. 15, 2011

(51) Int. Cl.
*G06F 3/00* (2006.01)
*G06F 13/00* (2006.01)

(52) U.S. Cl.
USPC .............................. 710/54; 710/56; 711/110

(58) Field of Classification Search
USPC ...................... 710/54, 56; 711/110
See application file for complete search history.

(56) References Cited

U.S. PATENT DOCUMENTS

| | | | |
|---|---|---|---|
| 4,809,217 A | 2/1989 | Floro et al. | |
| 6,384,753 B1 | 5/2002 | Brooks et al. | |
| 6,859,850 B1 | 2/2005 | MacCormack | |
| 7,653,762 B1 * | 1/2010 | Neuendorffer et al. | 710/18 |
| 8,122,177 B1 * | 2/2012 | Puranik | 710/308 |

FOREIGN PATENT DOCUMENTS

| | | |
|---|---|---|
| GB | 2484008 A | 3/2012 |
| JP | 04-288602 A | 10/1992 |
| JP | 07-044090 A | 2/1995 |
| JP | 08-069355 A | 3/1996 |
| JP | 2007-233593 A | 9/2007 |
| JP | 2008-020392 A | 1/2008 |
| JP | 2008-145336 A | 6/2008 |
| JP | 2008-287559 A | 11/2008 |

OTHER PUBLICATIONS

Taiwanese Office Action in Taiwanese Patent Application No. 098119165 dated Jan. 24, 2013.
German Office Action, dated Jun. 13, 2012.

* cited by examiner

*Primary Examiner* — Ernest Unelus
(74) *Attorney, Agent, or Firm* — Sughrue Mion, PLLC

(57) ABSTRACT

An A/D converter that is attached to a programmable controller (PLC) and sequentially converts an analog value inputted from outside into a digital value. The A/D converter includes: a shared memory that can read-access from a CPU unit that controls the entire PLC and includes a log storage area with a ring buffer configuration for sequentially logging the digital value and a parameter storage area for storing a head pointer serving as a parameter indicating a position where a next log data is stored; and a logging executing unit that writes a digital value in an address indicated by the head pointer in the log storage area as log data and updates the head pointer.

3 Claims, 5 Drawing Sheets

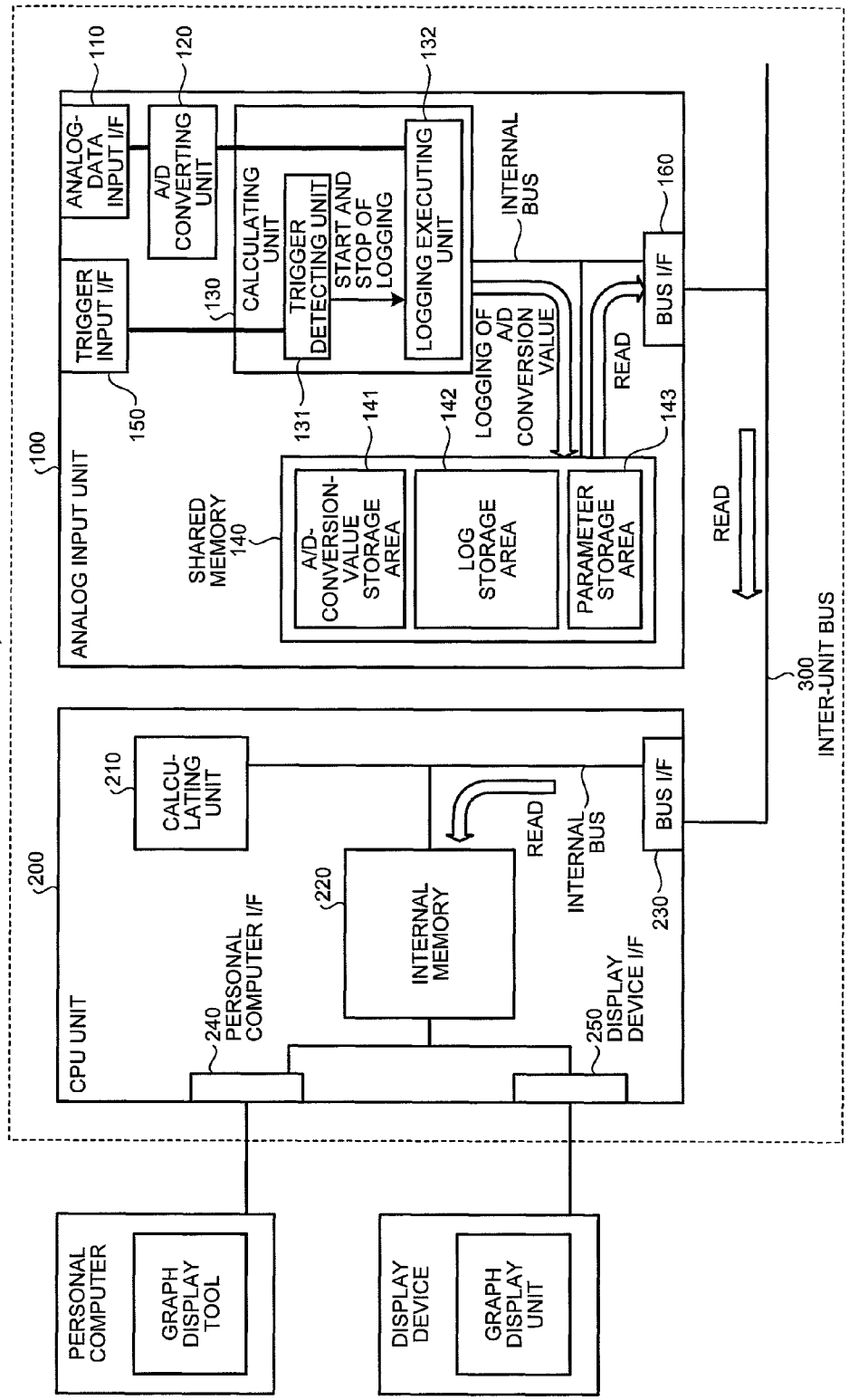

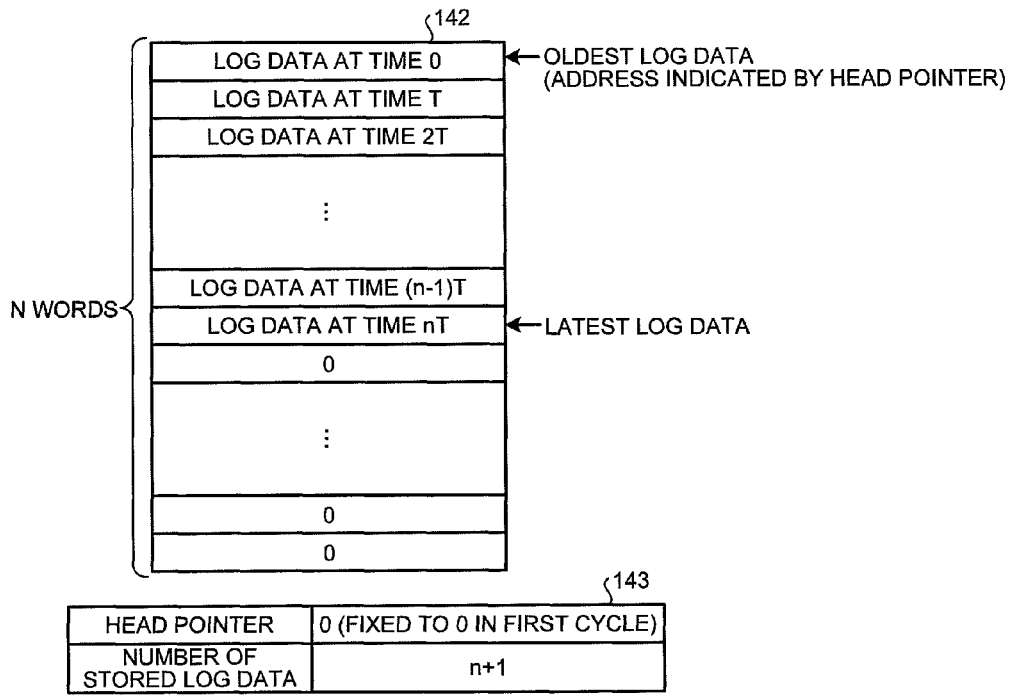
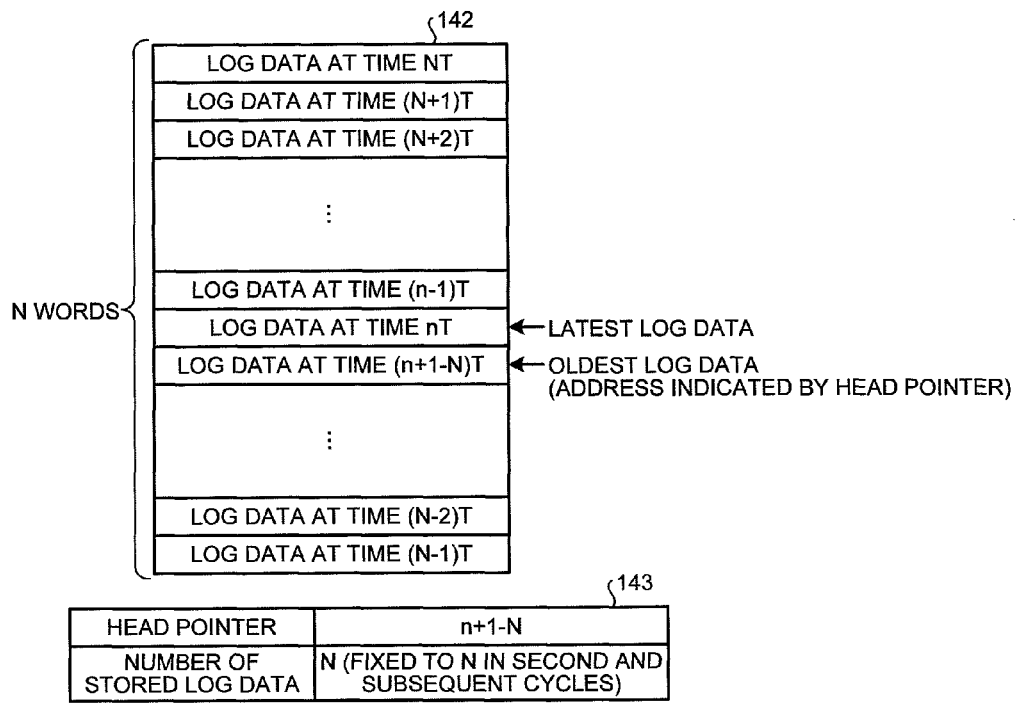

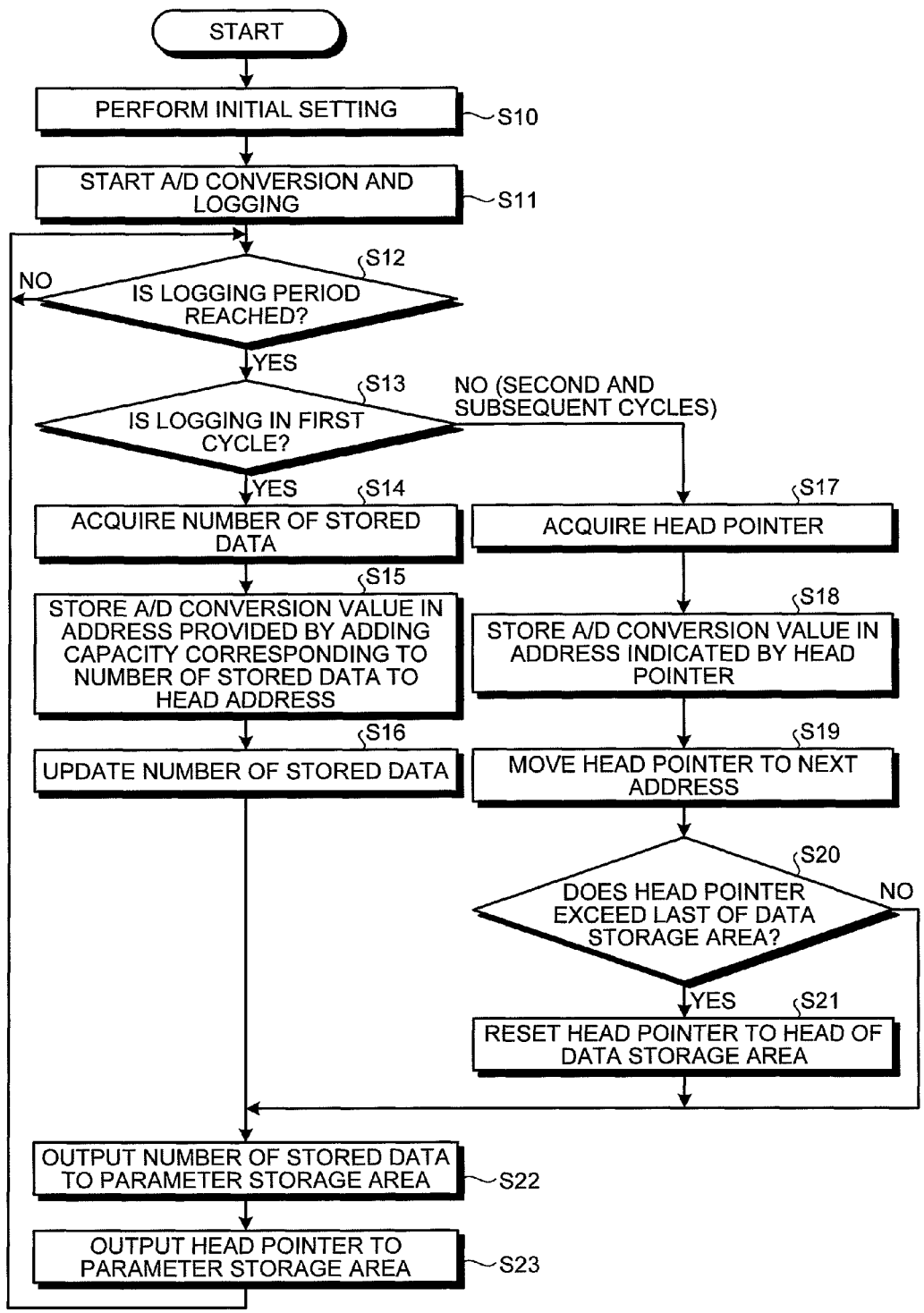

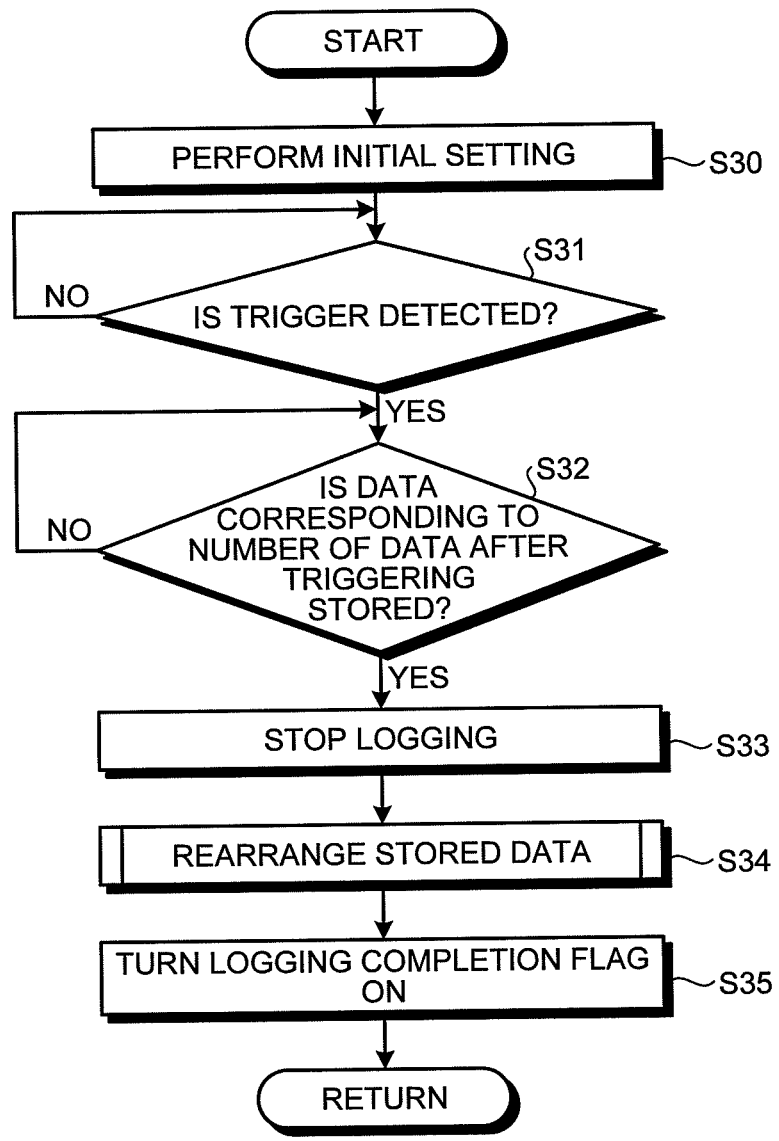

A/D CONVERTER AND PROGRAMMABLE CONTROLLER SYSTEM

CROSS REFERENCE TO RELATED APPLICATIONS

This application is a National Stage of International Application No. PCT/JP2009/055692 filed Mar. 23, 2009, the contents of all of which are incorporated herein by reference in their entirety.

TECHNICAL FIELD

The present invention relates to an A/D converter attached to a programmable controller (PLC) and to a programmable controller system.

BACKGROUND ART

When analog data values are inputted to a PLC, an analog input unit (an A/D converter) that converts an inputted analog data value into a digital value is used. Generally, a sampling period of A/D conversion of the analog input unit that converts an inputted analog data value into a digital value is not synchronous with a control period (a scanning time) of a CPU unit that controls the entire PLC, and the sampling period is usually faster. Therefore, when the analog input unit logs an A/D conversion value, it is difficult to log all A/D conversion values in the CPU unit without fail.

As a method of logging all A/D conversion values without fail, there is a method of performing a logging process in an analog input unit. However, in order to refer to collected data, the data needs to be read into a CPU unit after logging is completed. Because this reading process conventionally has required a dedicated communication process to be performed for many times, so that this process is laborious.

To solve this problem, there has been proposed a technique of storing A/D conversion values in a shared memory serving as a memory area that can be always accessed by a CPU unit without requiring any dedicated communication process (see, for example, Patent Document 1). Further, there has been proposed a technique of collecting data in a ring buffer manner as a method of collecting successive data (see, for example, Patent Document 2). Furthermore, there has been proposed a technique of collecting data in a shared memory in a ring buffer manner (see, for example, Patent Document 3).
Patent Document 1: Japanese Patent Application Laid-open No. H8-69355
Patent Document 2: Japanese Patent Application Laid-open No. 2008-20392
Patent Document 3: Japanese Patent Application Laid-open No. 2007-233593

DISCLOSURE OF INVENTION

Problem to be Solved by the Invention

However, according to the technique described in Patent Document 1, previous data is overwritten every time when data is stored, and thus data cannot be successively collected and referred to.

According to the technique described in Patent Document 2, the latest data and the oldest data cannot be distinguished from each other in a memory area with a ring buffer configuration, and thus collected data cannot be handled in a time series.

The technique described in Patent Document 3 is a technique of achieving logging synchronous with a control period of a CPU unit, and thus an A/D conversion value updated at a faster sampling period of A/D conversion cannot be logged.

The present invention has been achieved in view of the above problems, and an object of the present invention is to provide an A/D converter that can log all A/D conversion values without fail and can easily read logged data so that they can correspond to a time series without requiring any particular communication process, and to provide a PLC system.

Means for Solving Problem

In order to attain the above object, in An A/D converter that is attached to a programmable controller (PLC) and sequentially converts an analog value inputted from outside into a digital value, the A/D converter of the present invention includes: a shared memory that can read-access from a CPU unit that controls the entire PLC and includes a log storage area with a ring buffer configuration for sequentially logging the digital value and a parameter storage area for storing a head pointer serving as a parameter indicating a position where a next log data is stored; and a logging executing unit that writes a digital value in an address indicated by the head pointer in the log storage area as log data and updates the head pointer.

Effect of the Invention

According to the present invention, the log storage area with a ring buffer configuration is ensured in the shared memory, and the parameter storage area for storing the head pointer indicating an address of a boundary between the latest log data and the oldest log data stored in the log storage area is also ensured in the shared memory. Therefore, it is possible to provide an A/D converter that can log all A/D conversion values without fail and easily read logged data so that they can correspond to a time series without requiring any particular communication process.

BRIEF DESCRIPTION OF DRAWINGS

FIG. 1 depicts a configuration of a PLC system according to an embodiment of the present invention.
FIG. 2 is an explanatory diagram of data structures of data stored in a log storage area and a parameter storage area.
FIG. 3 is an explanatory diagram of data structures of data stored in the log storage area and the parameter storage area.
FIG. 4 is a flowchart for explaining an operation of an analog input unit according to the embodiment of the present invention.
FIG. 5 is a flowchart for explaining an operation of the analog input unit according to the embodiment of the present invention.

Figure 6:
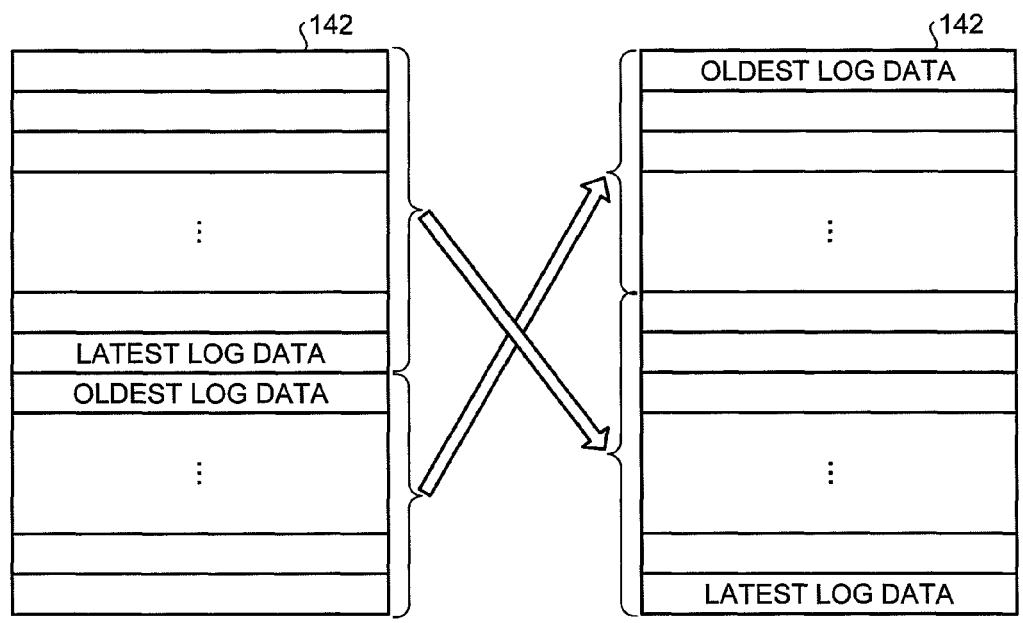
FIG. 6 is an explanatory diagram of rearrangement of log data.

EXPLANATIONS OF LETTERS OR NUMERALS 100 analog input unit
110 analog-data input I/F
120 A/D converting unit
130 calculating unit
131 trigger detecting unit
132 logging executing unit 140 shared memory
141 A/D-conversion-value storage area
142 log storage area
143 parameter storage area
150 trigger input I/F
160 bus I/F
210 calculating unit
220 internal memory
230 bus I/F
240 personal computer I/F
250 display device I/F
300 inter-unit bus
1000 PLC

BEST MODE(S) FOR CARRYING OUT THE INVENTION

Exemplary embodiments of an A/D converter according to the present invention will be explained below in detail with reference to the accompanying drawings. The present invention is not limited to the embodiments.

Embodiment

FIG. 1 is a block diagram for explaining a configuration of a PLC system including an A/D converter (an analog input unit). As shown in FIG. 1, an analog input unit 100 is connected to a CPU unit 200 via an inter-unit bus 300. The analog input unit 100 and the CPU unit 200 constitute a part of a PLC 1000. In addition to the analog input unit 100 and the CPU unit 200, a motion controller unit that controls a servo amplifier to perform multi-axis position control and a temperature controller unit that outputs a temperature control signal for heating and cooling so that a temperature instructed by the CPU unit 200 is reached are attached to the PLC 1000 via the inter-unit bus 300 depending on purposes; however, units other than the analog input unit 100 and the CPU unit 200 are not explained here.

The analog input unit 100 receives input of an analog data value from a sensor that observes various observation values related to industrial apparatuses to be controlled by the PLC 1000, such as a flow rate, pressure, and temperature to output these values as a current value and a voltage value, converts the input of the received analog data value into a digital value, and writes the digital value (an A/D conversion value) in a shared memory 140 provided in the analog input unit 100. The CPU unit 200 repeats, at a predetermined period, execution of a user program for operating various units provided in the PLC 1000 to control industrial apparatuses, output of execution results, and acquisition of input values such as values used by the user program. This repetitive operation is called "cyclic process". The CPU unit 200 reads a digital value (an A/D conversion value) of the observation value from the shared memory 140 as a part of an input-value acquiring operation included in the cyclic process.

The CPU unit 200 includes a calculating unit 210 that executes the user program and controls the entire CPU unit 200, an internal memory 220 serving as a memory for storing data required for executing the user program and input/output values of the user program, a bus I/F 230 serving as a communication interface for communicating with the analog input unit 100 via the inter-unit bus 300, and a personal computer I/F 240 and a display device I/F 250 serving as interfaces for connecting a personal computer and a display device as a peripheral device for setting the user program and displaying a state of data in the internal memory 220. The calculating unit 210, the internal memory 220, and the bus I/F 230 are connected to each other by an internal bus. A system including the PLC 1000 and peripheral devices (the personal computer and/or the display device) connected to the PLC 1000 is called "PLC system".

The shared memory 140 included in the analog input unit 100 is explained here. An A/D-conversion-value storage area 141 that stores A/D conversion values read by the cyclic process performed by the CPU unit 200 is ensured in the shared memory 140. As mentioned above, because an interval during which an analog data value is sampled to be converted into a digital value (a sampling interval) is usually faster than the period of the cyclic process, it is difficult for the CPU unit 200 to read all A/D conversion values written in the A/D-conversion-value storage area 141 and log these values without fail. According to an embodiment of the present invention, in addition to the A/D-conversion-value storage area 141 explained above, a log storage area 142 serving as a storage area for storing A/D conversion values as log data is ensured in the shared memory 140 that the analog input unit 100 can write data at a high speed and the CPU unit 200 can read-access without performing any complicated communication process. The log data stored in the log storage area 142 is read into a peripheral device via the inter-unit bus 300 and the CPU unit 200.

The log storage area 142 has a ring buffer configuration. That is, log data is written in the log storage area 142 in a time series from a head address. When the write address of the log data reaches the last one, the process is wrapped around and the log data is overwritten from the head address. It is assumed that a log-data write from when logging is started to when the process is wrapped around is represented as a first cycle write, and subsequent writes are represented as 1+nth cycle writes (n denotes the number of wraparounds). The shared memory 140 further includes a parameter storage area 143 that stores the number of stored data serving as a parameter for determining a latest-log-data write position in the first cycle and a head pointer serving as a pointer that indicates the latest-log-data write position in the second and subsequent cycles. Because the head pointer indicates the latest-log-data write position in the second and subsequent cycles, the head pointer indicates a boundary between the latest log data and the oldest log data.

FIGS. 2 and 3 are explanatory diagrams of data structures of the log storage area 142 and the parameter storage area 143. FIG. 2 depicts a data structure in the first cycle and FIG. 3 depicts a data structure in the second cycle. It is assumed that the log storage area 142 has a storage capacity corresponding to N words and log data of a word (an A/D conversion value as the log data) is written each time a time T elapses. As shown in FIG. 2, because a point of time when a time nT (n<N) elapsed since logging is started is in the first cycle, the head pointer is fixed to 0 and the number of stored data is n+1. That is, the next position where data is to be written is the position determined by the head address of the log storage area 142+ (n+1) words. As shown in FIG. 3, in the second cycle, the latest data is written in the position shifted from the head address by n−N words, and thus the head pointer is n+1−N and the number of stored data is N (fixed). The head pointer value in the third and subsequent cycles is mod(n, N)+1.

Referring back to FIG. 1, in addition to the shared memory 140 mentioned above, the analog input unit 100 includes an analog-data input interface (I/F) 110 that receives input of an analog data value, an A/D converting unit 120 that converts the received analog data value into a digital value (an A/D conversion value), a trigger input interface (I/F) 150 that receives a trigger for stopping logging of an A/D conversion value, a calculating unit 130 that controls the entire analog input unit 100, and a bus I/F 160 serving as a communication interface for communicating with the CPU unit 200 via the inter-unit bus 300. The calculating unit 130, the shared memory 140, and the bus I/F 160 are connected to each other by an internal bus.

The calculating unit 130 further includes a trigger detecting unit 131 that detects a trigger received by the trigger input I/F 150 and a logging executing unit 132 that sequentially writes an A/D conversion value outputted by the A/D converting unit 120 in the log storage area 142 as log data based on a trigger detected by the trigger detecting unit 131 and a parameter stored in the parameter storage area 143. The logging executing unit 132 writes log data corresponding to the number of data set in advance from when the trigger detecting unit 131 detects a trigger (the number of data after triggering) and then stops logging. As for the trigger, the following types of triggers can be used in addition to a trigger generated by a signal input from the trigger input I/F 150.

A trigger by an internal signal of the PLC 1000.

A trigger generated when the A/D conversion value is larger or lower than a set value.

A regular trigger generated everyday at the same time using internal clock information of the PLC 1000.

A buffer full trigger generated when the capacity of the log storage area 142 becomes full.

An error trigger and an alarm trigger in cooperation with an error output function and an alarm detection function included in the analog input unit 100.

A composite trigger generated by a plurality of AND conditions and OR conditions of the triggers mentioned above.

An operation of the embodiment of the present invention is explained with reference to FIGS. 4 and 5. FIGS. 4 and 5 are flowcharts for explaining an operation of the analog input unit 100.

With reference to FIG. 4, the logging executing unit 132 acquires initial setting related to logging set by a user (Step S10). In the initial setting, a logging period, a trigger type, and the number of data after triggering are set. The logging period is set so as to be an integral multiple of the period of a sampling interval.

Next, when A/D conversion by the A/D converting unit 120 is started, the logging executing unit 132 starts logging of an A/D conversion value (Step S11). Specifically, the logging executing unit 132 uses a timer and a counter to determine whether a logging-period interval time is reached for writing log data in the log storage area 142 every logging period (Step S12).

When the elapsed time from Step S11 or the previous write does not reach the logging-period interval time (NO at Step S12), a step of determining whether the logging-period interval time is reached is continued. When the logging-period interval time is reached (YES at Step S12), the logging executing unit 132 further determines whether the logging is in the first cycle (Step S13). For example, whether the logging is in the first cycle can be determined by determining whether the storage capacity indicated by the number of stored data is equal to the storage capacity in the log storage area 142.

When the logging is in the first cycle (YES at Step S13), the logging executing unit 132 acquires the number of stored data from the parameter storage area 143 (Step S14), and then writes an A/D conversion value outputted by the A/D converting unit 120 in an address provided by adding the capacity corresponding to the number of stored data to the head address of the log storage area 142 (Step S15). The logging executing unit 132 then performs updating of adding one to the number of stored data (Step S16).

When the logging is in the second and subsequent cycles (NO at Step S13), the logging executing unit 132 acquires a head pointer from the parameter storage area 143 (Step S17) and writes an A/D conversion value outputted by the A/D converting unit 120 in an address indicated by the head pointer of the log storage area 142 (Step S18). The logging executing unit 132 then adds one piece of data to the head pointer (Step S19) and determines whether the head pointer exceeds the last address of the log storage area 142 (Step S20). When the head pointer exceeds the last address (YES at Step S20), the head pointer is set to the head address of the log storage area 142 (Step S21).

When the head pointer does not exceed the last address of the log storage area 142 at Step S16, S21, or S20 (NO at Step S20), the logging executing unit 132 outputs the number of stored data to the parameter storage area 143 (Step S22) and the head pointer to the parameter storage area 143 (Step S23). The process then proceeds to Step S12.

An operation of the analog input unit 100 when a trigger is detected is explained next. FIG. 5 is an explanatory diagram of an operation of the analog input unit 100 when a trigger is detected.

The logging executing unit 132 first acquires initial setting and then the number of data after triggering (Step S30). The logging executing unit 132 then determines whether the trigger detecting unit 131 detects a trigger (Step S31). When a trigger is not detected (NO at Step S31), the determination is continued until a trigger is detected. When a trigger is detected (YES at Step S31), the logging executing unit 132 further determines whether data corresponding to the number of data after triggering since trigger detection is written in the log storage area 142 (Step 632). When the data corresponding to the number of data after triggering is not written in the log storage area 142 (NO at Step 632), the determination is continued until the data corresponding to the number of data after triggering is written.

Figure 7:
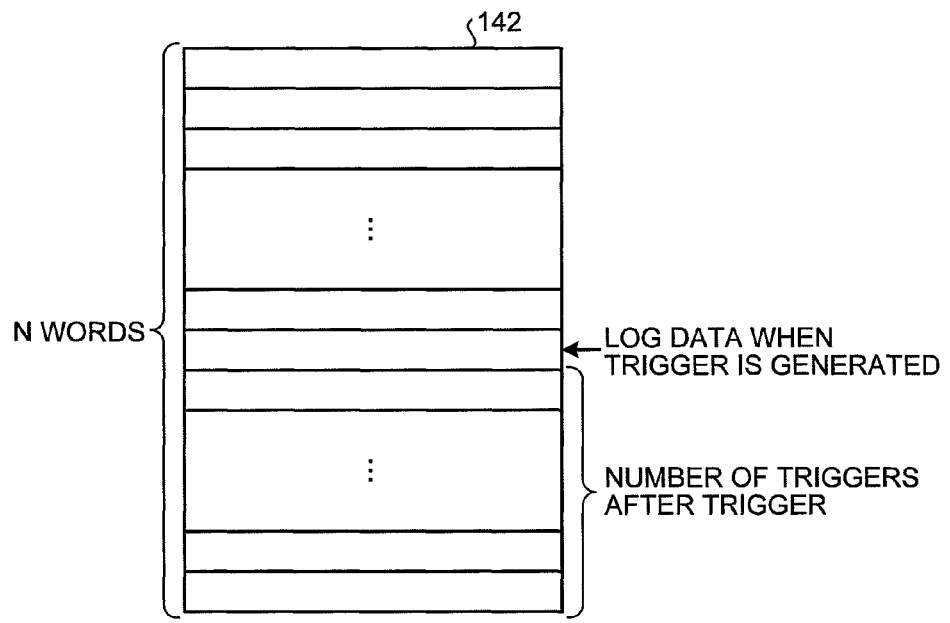
FIG. 7 is an explanatory diagram of a state of a log storage area after rearrangement.

When the data corresponding to the number of data after triggering is written in the log storage area 142 (YES at Step S32), the logging executing unit 132 stops a log data storage process (Step S33) and rearranges the log data stored in the log storage area 142 so as to be in a time series from the top of the log storage area 142 (Step S34). FIG. 6 is an explanatory diagram of the rearrangement at Step S34. As mentioned above, because the log storage area 142 has a ring buffer configuration, a boundary between the latest log data and the oldest log data exists at a predetermined point of time as shown in the left table of FIG. 6. The logging executing unit 132 rearranges the data stored as shown in the left table of FIG. 6 so as to be shown in the right table of FIG. 6, so that the oldest log data is stored at the top and the latest log data is stored at the last. FIG. 7 is an explanatory diagram of a state of the log storage area 142 after the rearrangement. As shown in FIG. 7, log data corresponding to the number of data after triggering is stored in addresses subsequent to a write address at the time of trigger detection. While the data are rearranged in a time series from the top, the data can be rearranged in a time series from the last.

After Step S34, the logging executing unit 132 turns a logging completion flag indicating that the logging has been completed ON (Step S35), and ends the operation. A part of bits in the shared memory 140 can be set as a storage area for the logging completion flag and the completion of the logging can be indicated when the bit of the storage area becomes 1. Alternatively, other storage areas can be set as the logging completion flag. Further, the logging executing unit 132 can notify the CPU unit 200 that the logging has been completed, while turning the logging completion flag ON. When the log data is sequentially read from the head address of the log storage area 142 into a personal computer or a display device in such a state, the log data can be acquired in a time series.

While it has been explained that the data are rearranged so as to be stored in a time series from the head address at Step S34, whether the operation of Step S34 is performed or skipped can be set by the initial setting. In a case where the operation is skipped, if a peripheral device reads the head pointer as well as the log data, the log data can be rearranged in a time series by the peripheral device. Further, the peripheral device can read-access the shared memory 140 to read the log data at any time as well as only when the logging completion flag is turned ON. At this time, as explained above, it is preferable that the head pointer is also read.

While it has been explained that logging is performed at a sampling process interval faster than the period of the cyclic process, the logging period can be set to be slower than the period of the cyclic process and log data can be read into the peripheral device via the CPU unit 200 in a substantially real-time manner. Further, when the read log data are arranged in a reading order, the peripheral device can create a real-time trend graph that indicates a temporal transition of log data.

As described above, according to the embodiment of the present invention, the analog input unit 100 is configured to ensure the log storage area 142 with a ring buffer configuration in the shared memory 140 and to store the head pointer indicating the address of a boundary between the latest log data and the oldest log data among log data stored in the log storage area 142 in the shared memory 140. Therefore, all A/D conversion values can be logged without fail and the logged data can be easily read so as to be capable of corresponding to a time series without requiring any particular communication process. Because the analog input unit 100 is configured to rearrange the log data stored in the log storage area 142 with the ring buffer configuration in a time series, log data in a time series can be read without performing any particular operations.

In the above explanations, while an A/D conversion value read by the cyclic process is stored in the A/D-conversion-value storage area 141 and the log data of the A/D conversion value is stored in the log storage area 142, the A/D-conversion-value storage area 141 can be deleted and the CPU unit 200 can read an A/D conversion value serving as log data stored in the log storage area 142 in the cyclic process. At this time, the CPU unit 200 preferably refers to a position where the latest data is stored based on the head pointer or the number of stored data. That is, in the case of the first cycle, the address that the latest A/D conversion value is stored is the address determined by adding the storage capacity corresponding to the number of stored data to the head address. In the case of the second and subsequent cycles, the address that the latest A/D conversion value is stored is the address indicated by (the head pointer −1). Further, when a user program uses a past value of the A/D conversion value, the CPU unit 200 can read the past value of the A/D conversion value stored in the log storage area 142 as the log data.

Further, the logging process can be restarted by releasing the trigger condition after logging is stopped due to detection of a trigger. With this configuration, starting and stopping of logging can be controlled by turning the trigger condition ON or OFF.

Furthermore, while it has been explained that logging is started when the A/D converting unit 120 starts A/D conversion, logging can be started by detecting a trigger after the A/D conversion is started.

INDUSTRIAL APPLICABILITY

As described above, the A/D converter and the PLC system according to the present invention are preferable for applications to an A/D converter attached to a PLC and a PLC system therefor.

The invention claimed is:

1. An analog/digital (A/D) converter that is attached to a programmable controller (PLC) and sequentially converts an analog value inputted from outside into a digital value, the A/D converter comprising:
   a shared memory that is read-accessed from a CPU unit that controls the entire PLC and includes a log storage area with a ring buffer configuration for sequentially logging the digital value and a parameter storage area for storing a head pointer serving as a parameter indicating a position where a next log data is stored; and
   a logging executing unit that writes a digital value in an address indicated by the head pointer in the log storage area as log data, updates the head pointer, and after stopping logging, changes storage positions of respective log data stored in the log storage area based on the head pointer to arrange the positions in a time series.

2. The A/D converter according to claim 1, wherein where a predetermined trigger is detected, when number of log data logged after a point of time when the trigger is detected reaches a predetermined number, the logging executing unit stops logging.

3. The A/D converter according to claim 2, wherein the predetermined trigger is one of signals in a group including an internal signal of the PLC, an input signal inputted from outside, a signal generated when an A/D conversion value is larger or less than a predetermined value, a regular signal using internal clock information of the PLC, a buffer full signal for stopping logging when no space is left in a capacity of the log storage area, and a signal generated when the A/D converter detects an alarm generated by the A/D converter.

* * * * *